United States Patent [19]

Shigeoka et al.

[11] Patent Number: 5,446,827
[45] Date of Patent: Aug. 29, 1995

[54] BIAS IMPRESSION FOR DEFUZZIFYING APPARATUS

[75] Inventors: Fumiaki Shigeoka; Masanari Oh, both of Fukuoka, Japan

[73] Assignee: Rohm Co., Ltd., Japan

[21] Appl. No.: 366,409

[22] Filed: Dec. 29, 1994

Related U.S. Application Data

[63] Continuation of Ser. No. 994,316, Dec. 21, 1992, abandoned.

[30] Foreign Application Priority Data

Dec. 27, 1991 [JP] Japan .................................. 3-347542
Dec. 28, 1991 [JP] Japan .................................. 3-359885

[51] Int. Cl.⁶ ............................................. G06F 7/70
[52] U.S. Cl. ............................................ 395/3; 395/10; 395/11; 395/900
[58] Field of Search .................. 395/3, 10, 11, 51, 900

[56] References Cited

U.S. PATENT DOCUMENTS

| | | | |
|---|---|---|---|
| 5,029,314 | 7/1991 | Katsumi et al. | 395/900 |
| 5,167,005 | 11/1992 | Yamakawa | 395/3 |
| 5,179,625 | 1/1993 | Hisano | 395/3 |
| 5,228,111 | 7/1993 | Nagazumi | 395/900 |
| 5,267,144 | 11/1993 | Yoshida et al. | 395/900 |
| 5,267,348 | 11/1993 | Someya et al. | 395/61 |

Primary Examiner—Allen R. MacDonald
Assistant Examiner—Tariq Hafiz
Attorney, Agent, or Firm—Oliff & Berridge

[57] ABSTRACT

A defuzzifying apparatus, for a fuzzy inference machine in which the consequent of a fuzzy inference is represented by a fuzzy set or a singleton, comprises a bias impression unit that adds an arbitrary-largeness bias value to each inference output grade, and circuitry a center of gravity of each inference output grade after the bias value is added. If the fuzzy inference is accomplished by hardware, it is possible to improve fluctuation of a final output due to noise or inference grade error. Even when an input does not match with any rule, any abnormal output can be prevented.

4 Claims, 9 Drawing Sheets

BIAS IMPRESSION FOR DEFUZZIFYING APPARATUS

This is a Continuation of Application Ser. No. 07/994,316 filed Dec. 21, 1992, now abandoned.

BACKGROUND OF THE INVENTION

1. Field of the Invention

This invention relates to a defuzzifying apparatus for realizing an ambiguous-information-based or ambiguous-knowledge-based fuzzy inference such as flow of control, pattern recognition, decision making, etc., by hardware.

2. Description of the Related Art

In recent years, flow of control and pattern recognition by fuzzy inference have been widely used. Generally an inference is done by a "if XXX then YYY" construction, namely, the "if-then" rule. In a fuzzy inference, either of the above XXX and YYY portions is constructed as a fuzzy set. The above portion "if XXX" is called the antecedent, and the above portion "then YYY" is called the consequent.

The algorithm of fuzzy inference consists of the following four processes:

(1) Decide to what extent the given input and the antecedent match each other for every inference rule.

(2) Obtain the result of inference for every inference rule from the consequent according to the result of the process (1).

(3) Integrate a number of inference results.

(4) Obtain a definite output value, as the final output, from the integrated inference result. This process is called a "defuzzification".

Various operations such as minimal value operations, maximal value operations, algebraic product operations and algebraic sum operations have been proposed to accomplish the above processes (1), (2) and (3). Regarding the defuzzifying process (4), however, it is a common practice to use the so-called center of gravity method (CG method) in which a definite output value is obtained from a center of gravity of the inference result expressed by a fuzzy set on a support set for the consequent.

Figure 9:
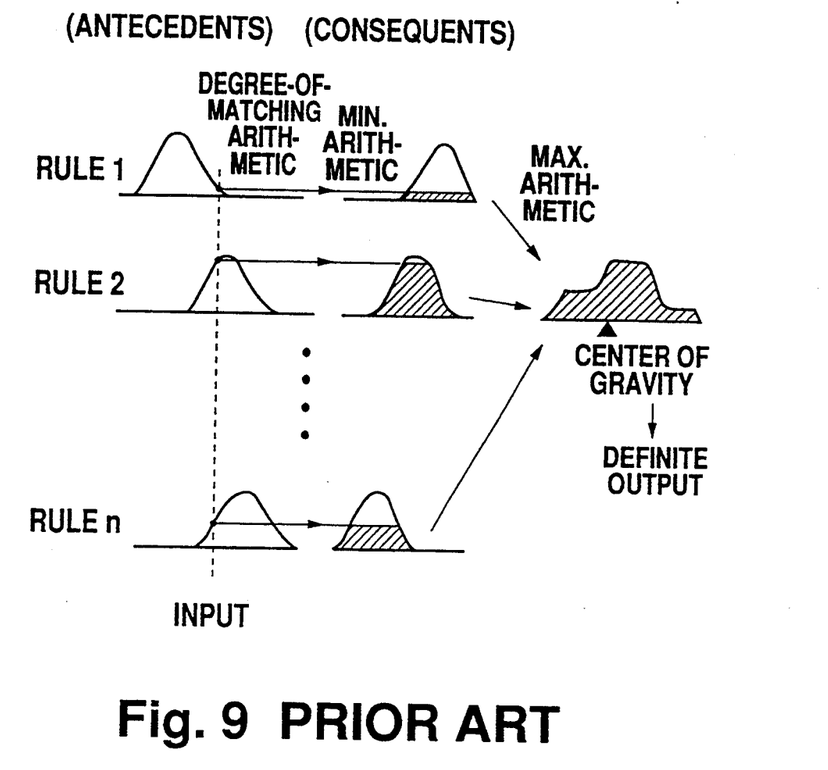
FIG. 9 is a diagram showing a fuzzy inference according to the minimum-maximum-gravity method according to the conventional art.

FIG. 9 of the accompanying drawings shows the general principle of the fuzzy inference algorithm by a minimum-maximum-gravity method which is very popular in the art. In this method, minimal value operations and maximal value operations are used to perform the processes (2) and (3), respectively. Further the above-mentioned CG method is used, as the defuzzifying process of the process (4), to calculate a definite output.

Figure 10:
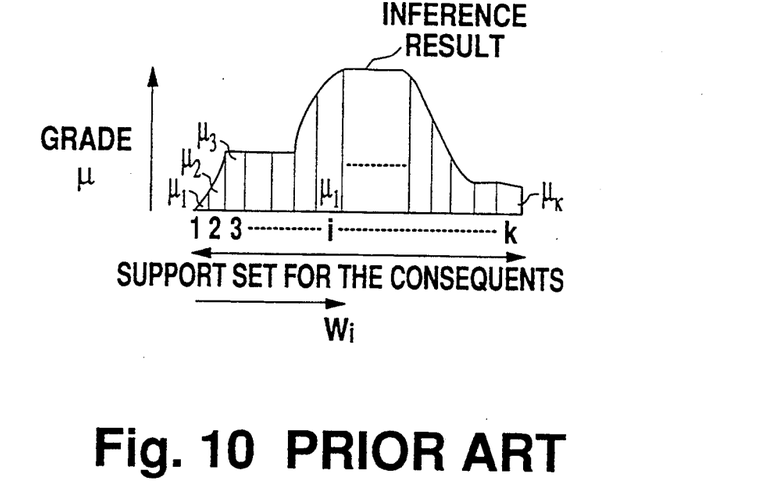
FIG. 10 is a diagram showing an integrated inference result according to the conventional art.

The practical operation for calculating the center of gravity is expressed by tile following equation:

$$CG \text{ value} = \frac{\sum_{i=1}^{k} w_i \mu_i}{\sum_{i=1}^{k} \mu_i} \quad (1)$$

wherein, as shown in FIG. 10, k is the number of divisions in the support set for the consequents, i is the address of each division, $\mu_1$ is a degree of grading representing the inference result of address i, and $w_1$ is a weighting factor representing the position of address 1 on the x coordinate.

Recently it has been confirmed that there would be no inconvenience with the inference result even if the YYY portion of the consequents is a constant (singleton) rather than a fuzzy set. This method is called "the simplified method"; since the number of calculation processes is considerably reduced, the number of practical applications for this method in various fields, especially in control technology is on the increase. This is called "simplified fuzzy inference".

Figure 11:
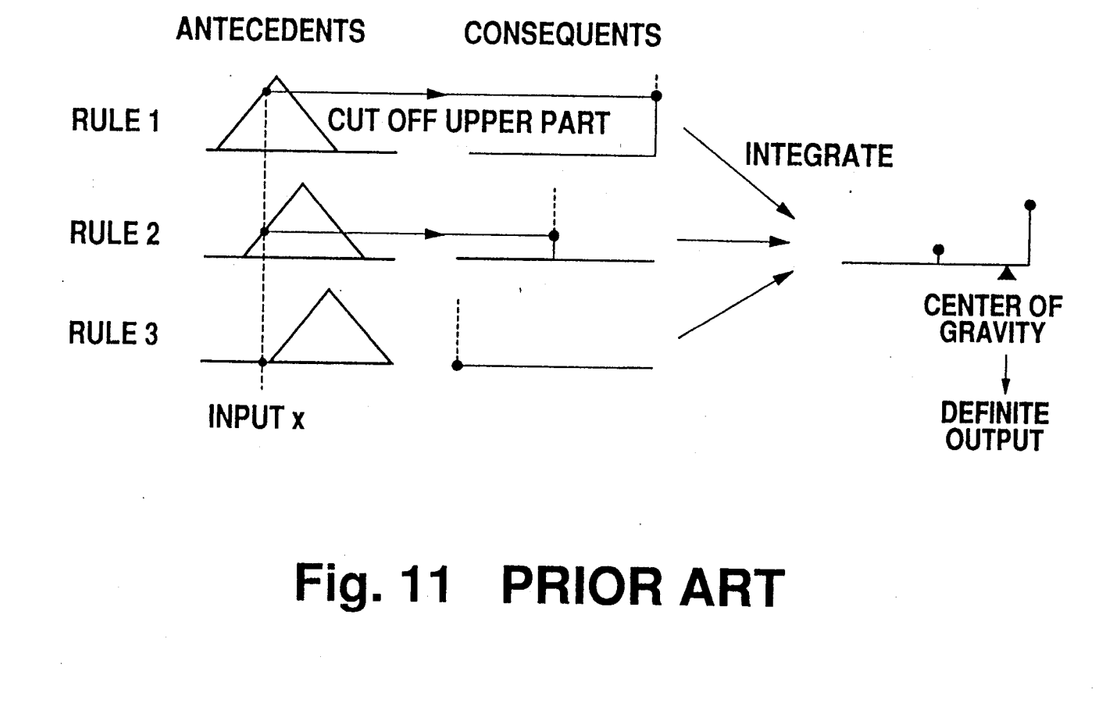
FIG. 11 is a diagram showing the process of a simplified fuzzy inference according to the conventional art.

The algorithm of a simplified fuzzy inference will accordingly be described in conjunction with FIG. 11. A given input x is compared and collated with a membership function described in the antecedent for each rule 1, 2, 3, to calculate a value corresponding to the input. This value is called "the degree of matching"; the inference result for each and every rule can be obtained by cutting off the consequent by tile degree of matching.

In a simplified fuzzy inference, since the consequent consists of a singleton, the degree of matching of the antecedent is regarded as the degree of grading of the inference result.

Then the degrees of grading of inference results obtained from a number of rules must be integrated to output only a single definite value. This process is called "the defuzzification", in which, as with the conventional art, a center of gravity is obtained.

This calculation is expressed by the following equation:

$$V_o = \frac{\sum_{i=1}^{n} w_i \mu_i}{\sum_{i=1}^{n} \mu_i} \quad (2)$$

where 1 is each singleton constituting the consequents, n is the sum of singletons, $w_1$ is the position of each singleton on the x coordinate, i.e. a constant, $\mu_1$ is a degree of inference grading corresponding to each singleton. The numerator will be a weighted sum value of individual inference grades, while the denominator will be a simple sum value. When the weighted sum value is divided by the simple sum value, a center of gravity will be obtained as a definite output of fuzzy inference.

Figure 12A:
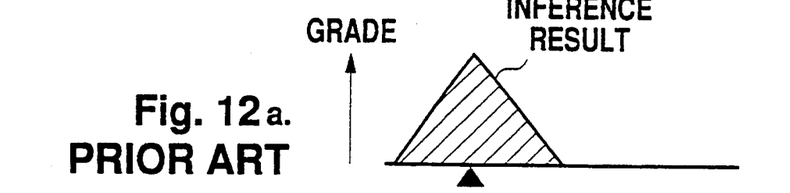
FIGS. 12a to 12c inclusive show how a center of gravity varies according to the degree of grading of inference result according to the conventional art.
Figure 12B:
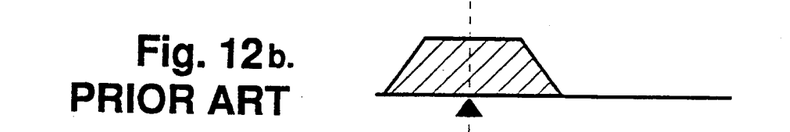
Figure 12C:
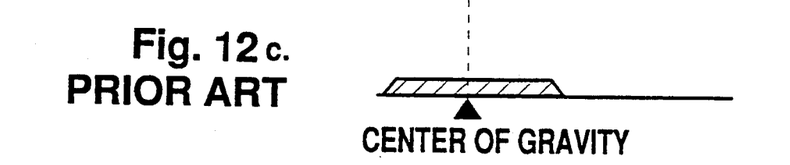

One of the features of the gravitational method as a defuzzifying process is that, as shown in FIGS. 12a, 12b and 12c, the center of gravity will not fluctuate even if the degree of grading of the inference result is varied. Either if the degree of grading of the inference result is large as shown in FIG. 12a or if it is small as shown in FIGS. 12b and 12c, their respective center of gravity are identical unless they are not 0. Consequently, tile following problems were encountered.

Figure 13A:
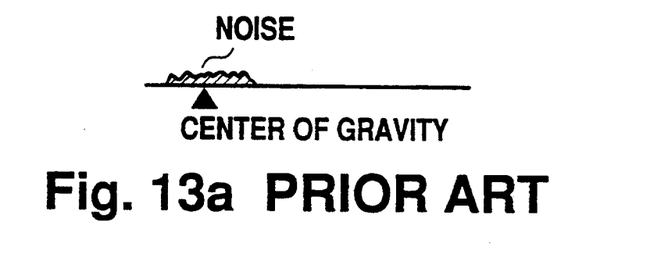
FIGS. 13a and 13b show an abnormal output due to noise according to the conventional art and the result of this invention.

(1) Assuming that the defuzzifying process is realized by hardware, an abnormal definite output value will be outputted only in the presence of a small amount of noise or error in the inference result. For example, a center of gravity due to noise will be outputted as correct even in the absence of any grade of inference result as shown in FIG. 13a.

(2) In the conventional method, if an input does not match any of the inference rules at all, the degree of grading of the inference result is 0. At that time, either of the numerator and denominator of equation (1) will be 0 so that the center of gravity cannot be calculated; therefore, assuming that the defuzzifying process is realized by hardware, an abnormal value will be outputted if the input does not match any of the inference rules at all.

SUMMARY OF THE INVENTION

It is therefore a first object of this invention to provide defuzzifying hardware if a fuzzy inference is realized by hardware which can accomplished the following:

(1) Improve the tolerance of a definite output to noise or error in the degree of grading of inference result.

(2) Avoid definite output abnormalities caused by input values which do not match any of the inference rules at all.

(3) Calculate a definite output according to the degree of grading of inference result.

A second object of the invention is to provide simplified fuzzy inference hardware in which fluctuation of a final output resulting from noise or error in the degree of grading of inference and in which an abnormal output occurrs if an input value does not match any of the inference rules at all.

According to a first aspect of the invention, there is provided a defuzzifying apparatus for a fuzzy inference machine in which the consequent of a fuzzy inference rule is represented by a fuzzy set, the apparatus comprising: means for impressing an arbitrary-largeness bias value to each inference output grade; means for calculating a center of gravity of each inference output grade after the bias value is impressed.

Figures 3A, 3B:
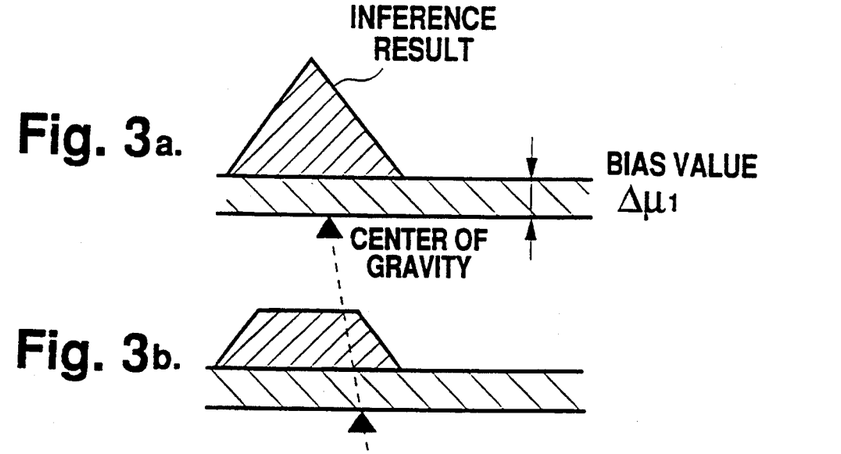
FIGS. 3a to 3c inclusive show how a center of gravity varies according to the degree of grading of inference result when a bias value is impressed.
Figure 3C:
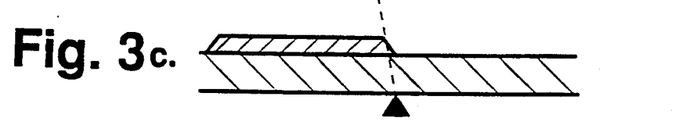
Figure 4:
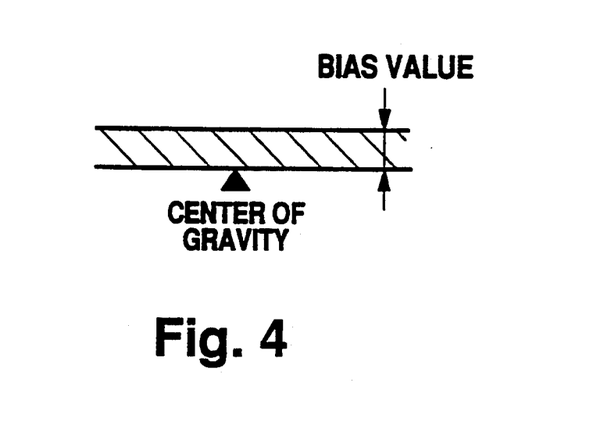
FIG. 4 shows the result of impression of a bias value if an input does not match with any inference rule.
Figure 13B:
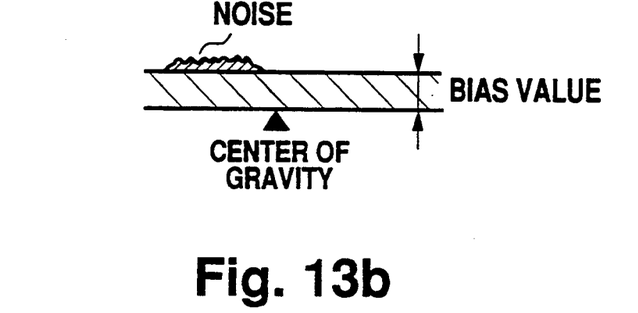

With this first arrangement, partly since a bias value is impressed to the degree of grading of inference result and partly since center of gravity is calculated as a definite output value by using the degree of grading of inference result after impressing bias value, the definite output value (center of gravity) will become less affected by noise or error, as shown in FIG. 13b. Even when the degree of grading of inference result is 0 as shown in FIG. 4, the center of gravity will be adjusted to a suitable value by the impressed bias value. Furthermore, it is possible to calculate a definite output value according to the degree of grading of inference as shown in FIG. 3. The magnitude and shape of the bias value may be adjusted according to the application.

According to a second aspect of the invention, there is provided a defuzzifying apparatus for a fuzzy inference machine in which the consequent of a fuzzy inference rule is represented by a singleton, the apparatus comprising: means for impressing an arbitrary-largeness bias value to each inference output grade after the bias value is impressed.

With this second arrangement, partly since a suitable bias value has been previously impressed to the degree of grading of each inference result to correct the degree of grading, and partly since the center of gravity is calculated by using the degree of grading of inference result after the correction, it is possible to lessen or reduce fluctuation of a final output value resulting from noise or error by determining the suitable bias value according to the magnitude of error or noise. Further, since the degree of grading of inference will not be 0 even when the input does not match any of the inference rules, it is possible to avoid any abnormal outputs.

DETAILED DESCRIPTION

Figure 1:
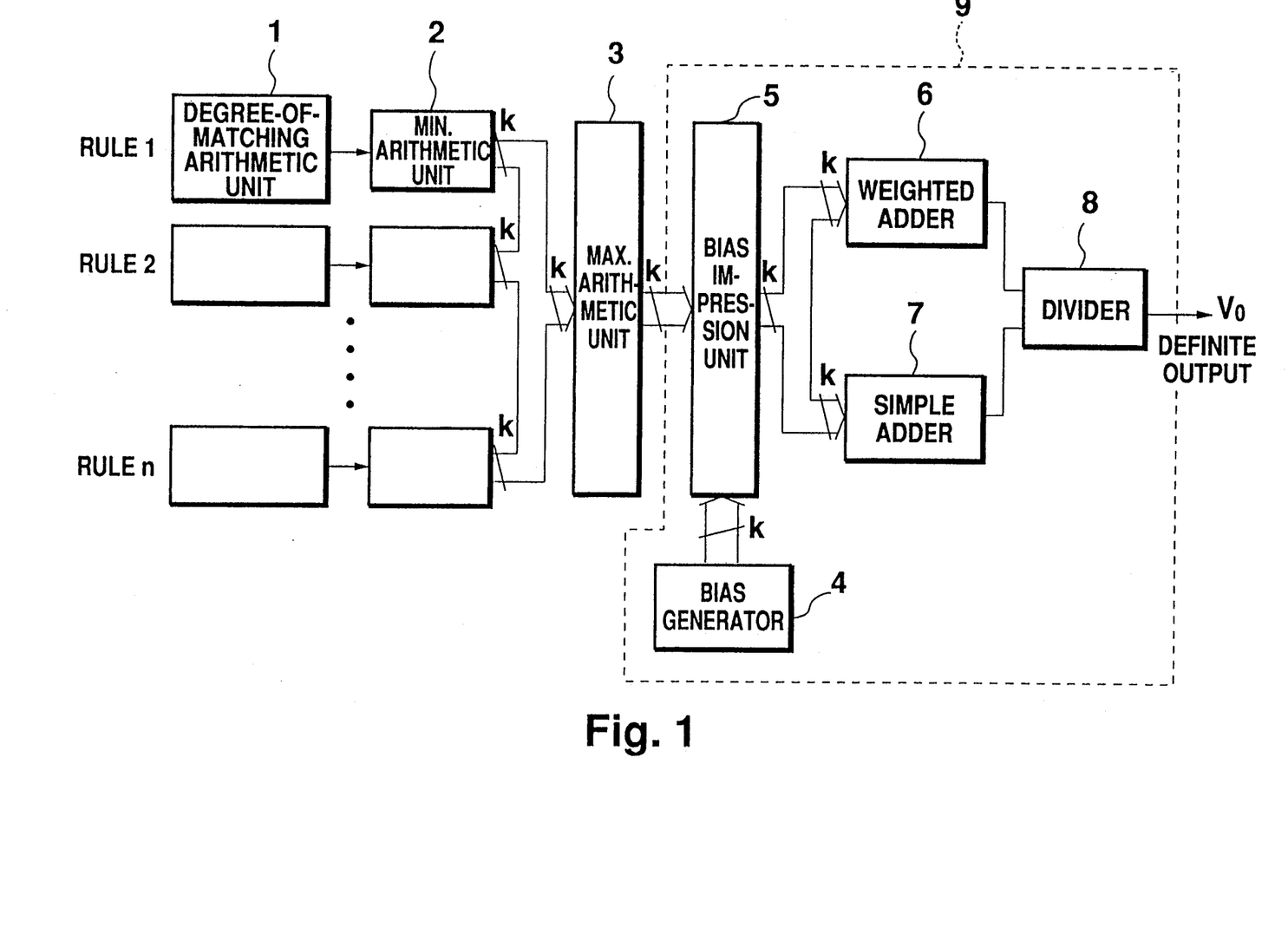
FIG. 1 is a block diagram showing a defuzzifying apparatus of a first embodiment of this invention.
Figure 5:
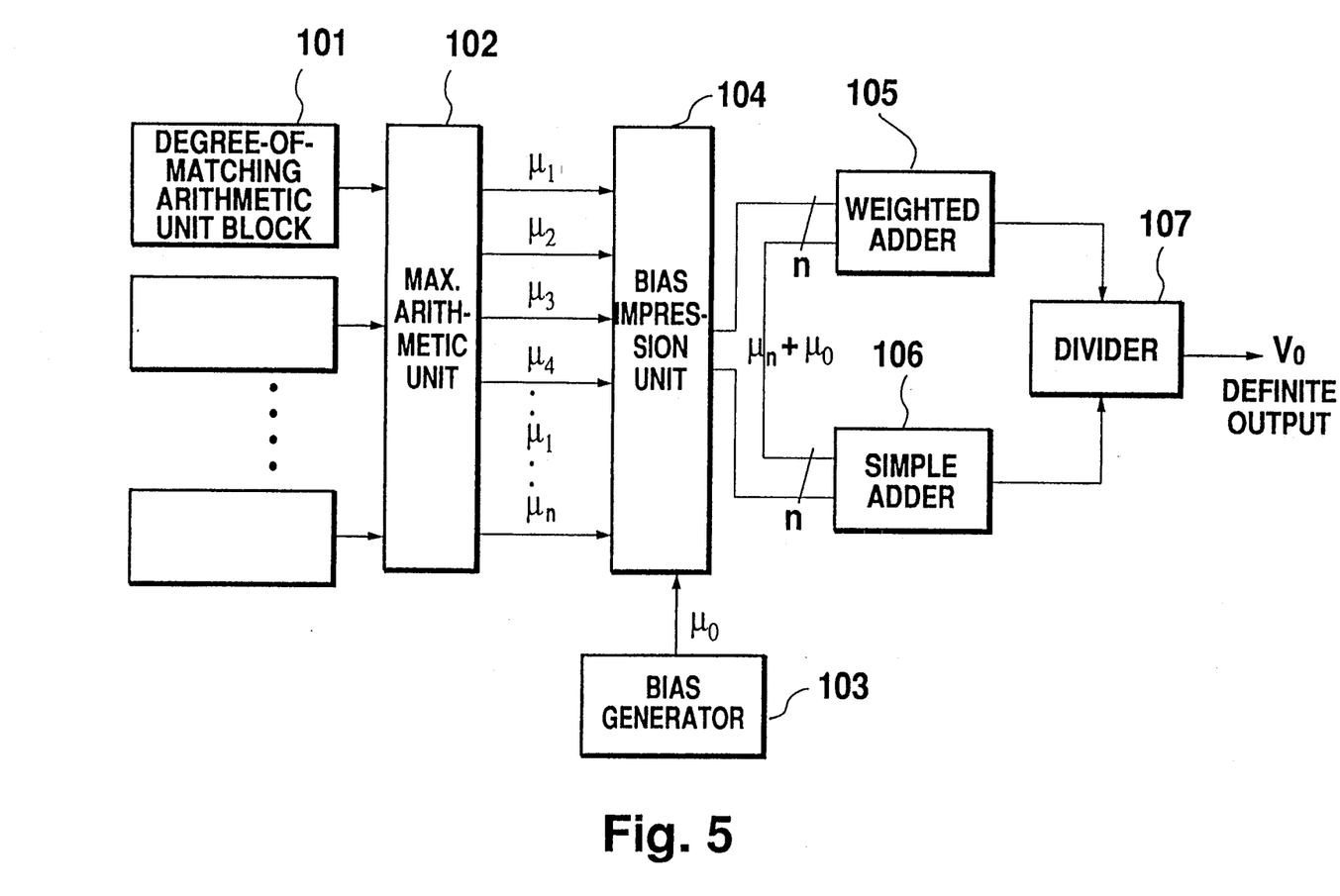
FIG. 5 is a block diagram showing the basic construction of a defuzzifying apparatus of a second embodiment of this invention.

The principles of this invention are particularly useful when embodied in a defuzzifying apparatus such as shown in FIGS. 1 and 5.

First Embodiment:

FIG. 1 shows a defuzzifying apparatus according to a first embodiment of this invention, in which the defuzzifying process is realized by hardware. In this embodiment, the minimum-maximum-gravity method is used as the inference method. Specifically, for each of n number of inference rules, the degree of matching between a given input and the antecedent is obtained by a degree-of-matching arithmetic unit 1. Then a minimal value operation is carried out between the degree of matching obtained by a minimal value arithmetic unit 2 and the consequent. Thus an inference result is obtained for each and every inference rule.

The individual inference results are input to a maximal value arithmetic unit 3, which has input terminals equal in number to the number k of divisions of a support set of the consequent, and the inference results are thereby integrated. The integrated inference result is inputted to defuzzifying hardware 9.

In the defuzzifying hardware 9, a bias value is added to the integrated inference result by a bias impression unit 5. A bias value to be added may be determined in value and distribution according to the bias generator 4. A bias value may be of a negative value. The inference result to which the bias value is impressed is input to a weighted adder 6 and a simple adder 7, and their outputs are inputted to a divider 8 which calculates a center of gravity to be outputted. This center of gravity is a final definite output and is expressed by the following equation:

$$\text{Center of gravity} = \frac{\sum_{i=1}^{k} w_i(\mu_i + \Delta\mu_i)}{\sum_{i=1}^{k} (\mu_i + \Delta\mu_i)} \quad (3)$$

where $\Delta\mu_1$ is a bias value impressed to address i of a support set of the consequent.

Figure 2:
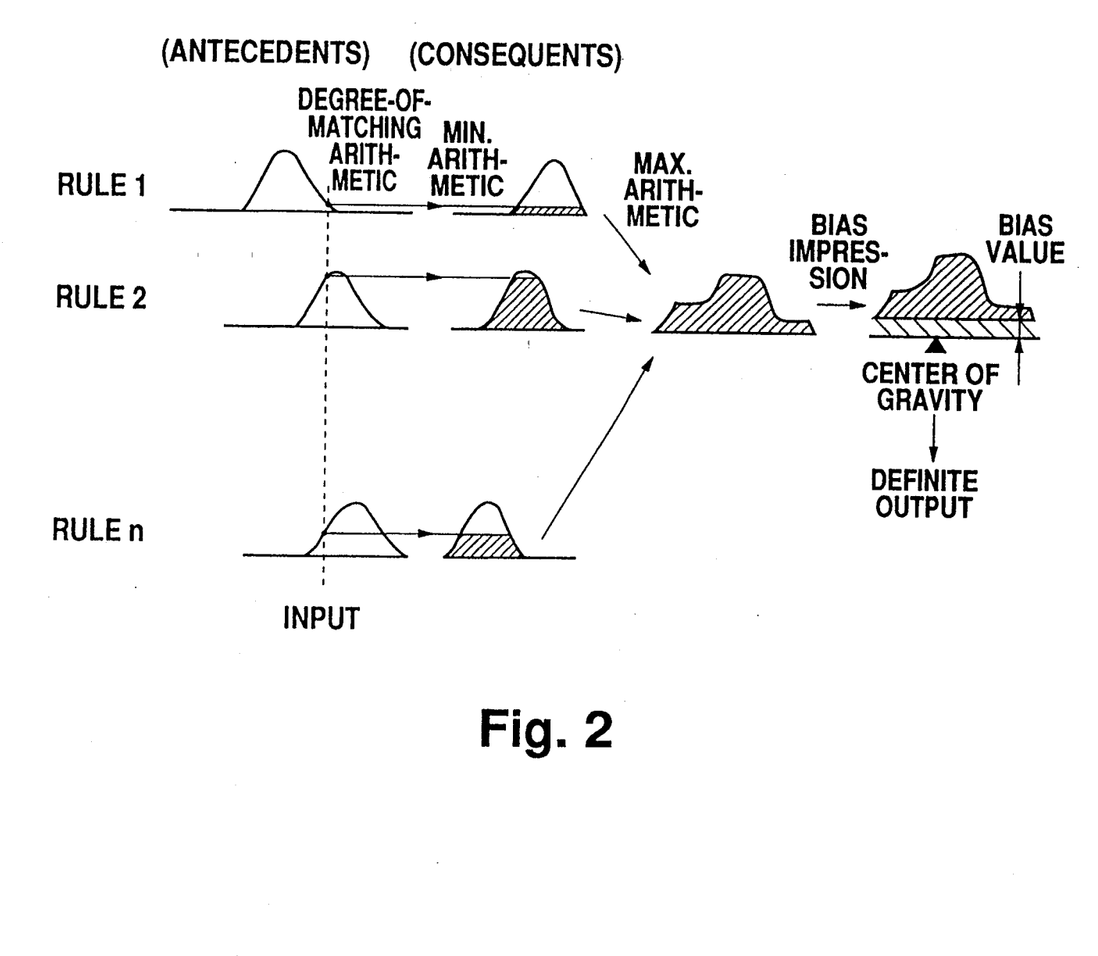
FIG. 2 is a diagram showing an inference algorithm according to the first embodiment.

FIG. 2 shows the principle of a inference algorithm according to this embodiment.

In this embodiment, assuming that $\Delta\mu_1$, is a constant, an action will occur so as to draw the center of gravity toward the center of the consequent as shown in FIG. 3. The smaller the degree of grading of inference result, the stronger this drawing action will become. Therefore if the degree of grading of inference result is small so as not to negate the effect of noise or error, the center of gravity will be located near the center of the consequent.

In fuzzy control as a typical practical application of fuzzy inference, the quantity of control is 0 in the center of the consequent, in order to maintain the current state, so that error control resulting from noise or error can be improved.

As shown in FIG. 4, even when the input does not match any of inference rules at all, either of the numerator and denominator of equation (3) will not be 0 so that any abnormal output will not be generated from the divider 8. Since the output at that time is located at the center of the consequent, the quantity of control will be 0 in the example of fuzzy control; this is, in the absence of any inference rule to match, there will be no control, as would be the case with the natural judgment of a human being.

If $\Delta\mu_1$ is set to various magnitudes and shapes rather than a constant. It is possible to cause an effect so as to draw the center of gravity not only toward the center but also other suitable position of the consequent according to the degree of grading of inference result.

In this embodiment, the practical arithmetic method of the bias impressing unit 5 may be accomplished not only by addition according to algebraic sum but also by, for example, maximal value arithmetic operation. In the inference arithmetic operation prior to defuzzifying, the minimal value arithmetic unit 2 and the maximal value arithmetic unit 3 may be replaced with an algebraic product arithmetic unit and an algebraic sum arithmetic unit, respectively.

Second Embodiment

FIG. 5 shows a defuzzifying apparatus according to a second embodiment of this invention, in which the defuzzifying process is realized by hardware. In FIG. 5, the output of a degree-of-matching arithmetic block 101 provided for each rule is integrated for every singleton of the consequent by a maximal value arithmetic block 102. The integrated inference grade is $\mu_1$ where 1 is a number representing each singleton.

Meanwhile, in a bias generator 103, a suitable bias value $\mu_o$ selected from outside is generated. In a bias impression unit 104, the output $\mu_1$ of the maximal value arithmetic block 2 and the output $\mu_o$ of the bias generator 103 are added, and then the resulting value $\mu_1 + \mu_o$ is outputted. This value is inputted to a subsequent-stage weighted adder 105 and a simple adder 106, and then the following values will be obtained respectively.

$$\left.\begin{array}{c} \sum_{i=1}^{n} w_i(\mu_i + \mu_o) \\ \sum_{i=1}^{n} (\mu_i + \mu_o) \end{array}\right\} \quad (4)$$

By dividing between the above two values by a divider block 107, a final definite output $V_o$ expressed by the following equation is calculated.

$$V_o = \frac{\sum_{i=1}^{n} w_i(\mu_i + \mu_o)}{\sum_{i=1}^{n} (\mu_i + \mu_o)} \quad (5)$$

Assuming that there exists an error $\Delta\mu$ in $\mu_1$, the error is corrected if the bias value is set as $\mu_o = \Delta\mu$, thus preventing any deviation of tile final definite output $V_o$. If $\mu_1$ is different for every i, the bias value is set for every i. Further, by impressing a positive bias value previously and intentionally to deviate $\mu_1$, it is possible to improve fluctuation of $V_o$ with respect to noise.

Figure 6A:
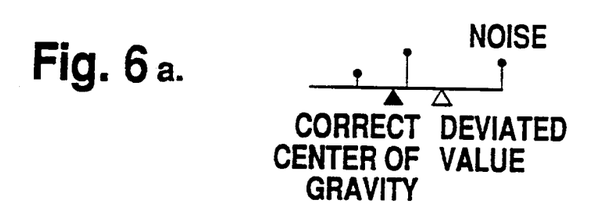
FIGS. 6a and 6b show how to obtain a center of gravity in this invention.
Figure 6B:
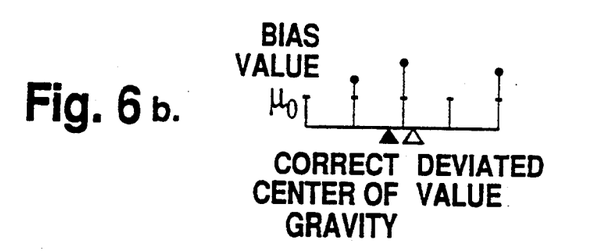

FIGS. 6a and 6b show this control; if no bias value is impressed, $V_o$ will fluctuate to a large extent due to noise as shown in FIG. 6a, and on the contrary, if an bias value $\mu_o$ is impressed, a deviation of $V_o$ due to noise will be improved. Further, since the input of the dividing block will be 0 even when the input does not match any of tile rules at all, no abnormal output will be generated. At that time $V_o$ is expressed by the following equation:

$$V_o = \frac{\sum_{i=1}^{n} w_i \mu_o}{\sum_{i=1}^{n} \mu_o} = \frac{\mu_o \sum_{i=1}^{n} w_i}{n\mu_o} = \frac{\sum_{i=1}^{n} w_i}{n} \quad (6)$$

Figure 7:
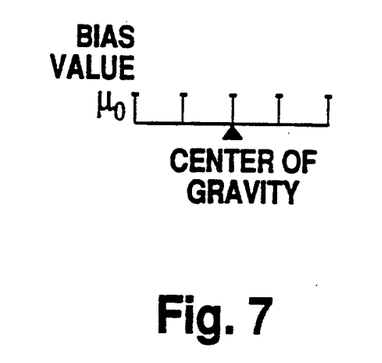
FIG. 7 shows the result when the center of gravity is obtained in this invention.

By dividing between the above two values by a divider block 107, a final definite output $V_o$ expressed by the following equation is calculated. In a typical fuzzy control, it is equivalent to a quantity control at the central value being 0; that is, in the absence of any rule to fit, no control will be done, which coincides with a natural Judgment of the human being. This procedure is shown in FIG. 7. In this example, the same bias value $\mu_o$ is used for every $\mu_1$. Alternatively a different bias value may be set for each $\mu_1$.

Figure 8:
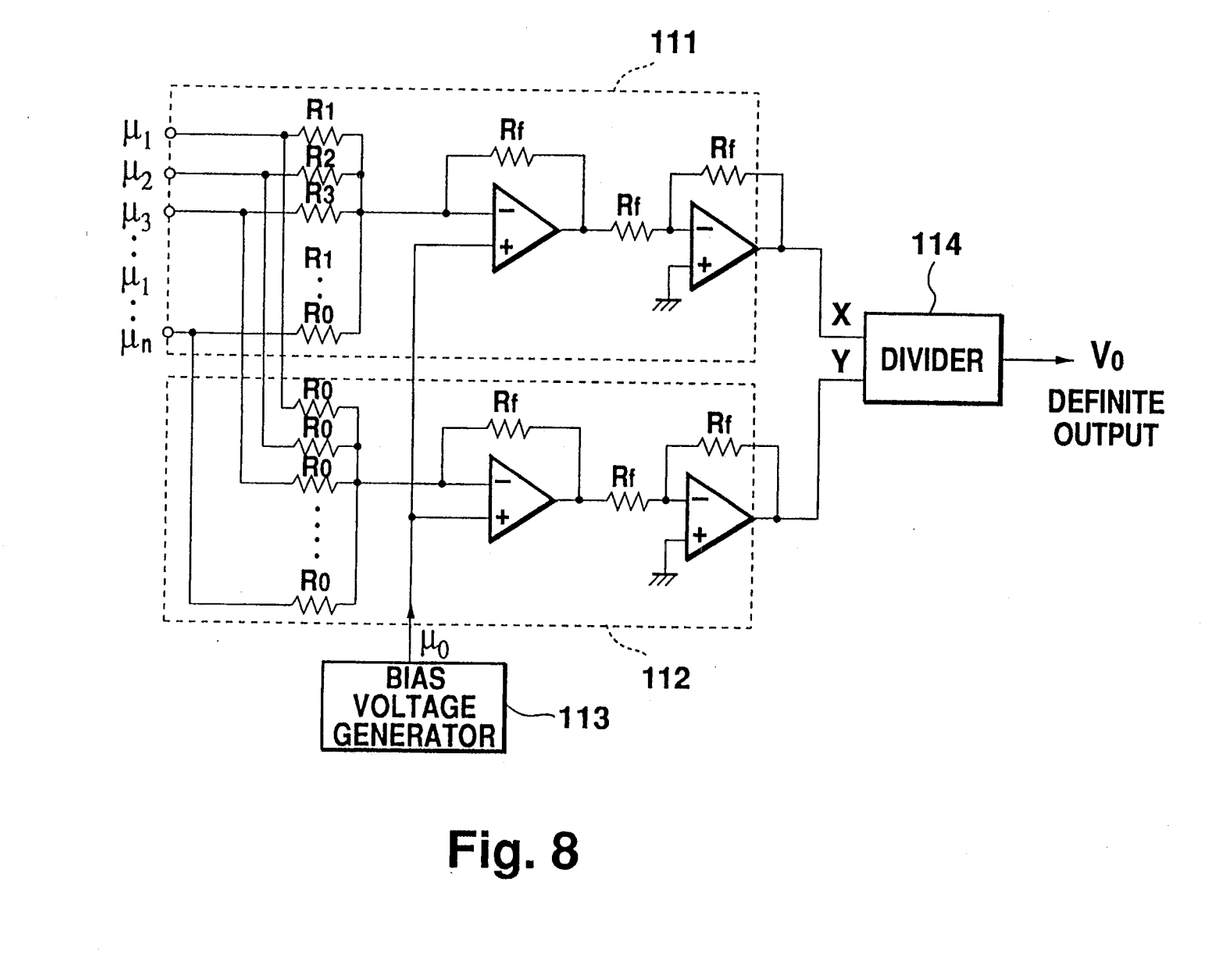
FIG. 8 is a circuit diagram showing the defuzzifying apparatus of the second embodiment.

FIG. 8 shows an example in which the defuzzifying hardware of this invention is an analog electric circuit. In the analog electric circuit, a weighted adder 111 and a simple adder 112 includes a group of n number of resistors and an operational amplifier, respectively. An inference grade voltage $\mu_1$ and a bias voltage $\mu_o$ generated from a bias voltage generator 113 are inputted to the two adding blocks 111, 112, respectively. As a result, the output X of the weighted adder 111 and the output Y of the simple adder 112 are expressed by the following equation:

$$X = \sum_{i=1}^{n} \frac{R_f}{R_i} (\mu_i - \mu_o) \quad (7)$$

$$Y = \sum_{i=1}^{n} \frac{R_f}{R_o} (\mu_i - \mu_o)$$

These values are inputted to a divider 114 which finally outputs a definite output voltage $V_o$ expressed as follows:

$$V_o = \frac{X}{Y} = R_o \frac{\sum_{i=1}^{n} \frac{1}{R_i}(\mu_i - \mu_o)}{\sum_{i=1}^{n}(\mu_i - \mu_o)} \qquad (8)$$

If $1/R_1$ and $R_o$ of equation (8) are regarded as $w_1$ of equation (5) and as a coefficient, respectively, equation (8) is equivalent to equation (5).

In this example, if there exists noise or error in the inference grade voltage $\mu_1$, it is possible to improve fluctuation of the output voltage $V_o$ by selecting a suitable bias voltage $\mu_o$.

Further if $\mu_o$ is a negative voltage, the input of the divider will not become 0V so that it is possible to prevent the abnormality of $V_o$ even when there exists no fit rule.

As mentioned above, according to the first and second embodiments of this invention, the following results can be achieved:

(1) If a fuzzy inference is realized by hardware, it is possible to improve the abnormality of a definite output generated due to noise or error caused in the degree of grading of inference result.

(2) It is possible to prevent the abnormality of a definite output generated when an input value fits to no inference rules at all.

(3) it is possible to calculate a definite output according to the degree of grading of inference result.

(4) Since the margin for noise or error would be large, it is possible to facilitate development of hardware and thence to realize inexpensive hardware.

(5) Even if the output precision of inference result of the front inference arithmetic block, one kind of defuzzifying hardware can be used for various applications by adjusting the magnitude and shape of a bias value.

What is claimed is:

1. A defuzzifying apparatus for generating a defuzzified output by defuzzifying a plurality of inference output grades generated by a fuzzy inference machine, said apparatus comprising:
   (a) a bias impression unit that adds an arbitrary bias value to each of the plurality of inference output grades generated by said fuzzy inference machine to generate a plurality of biased inference output grades; and
   (b) calculating means for calculating a center of gravity of the plurality of biased inference output grades, the center of gravity being the defuzzified output, wherein the arbitrary bias value reduces effects on the center of gravity caused by one of errors in the inference output grades and noise.

2. The defuzzifying apparatus according to claim 1, wherein the calculating means comprises:
   a weighted adder connected to said bias impression unit and generating a weighted addition value from the plurality of biased inference output grades;
   a simple adder connected to said bias impression unit and generating a simple addition value from the plurality of biased inference output grades; and
   a divider dividing the weighted addition value by the simple addition value to generate the center of gravity.

3. A defuzzifying apparatus for generating a defuzzified output by defuzzifying an inference output grade generated by a fuzzy inference machine, said apparatus comprising:
   (a) a bias impression unit that adds an arbitrary bias value to the inference output grade generated by said machine to generate a biased inference output grade; and
   (b) calculating means for calculating a center of gravity of the biased inference output grade, the center of gravity being the defuzzified output wherein the arbitrary bias value reduces effects on the center of gravity caused by one of errors in the inference output grades and noise.

4. The defuzzifying apparatus according to claim 3, wherein the calculating means comprises:
   a weighted adder connected to the bias impression unit and generating a weighted addition value from the biased inference output grade;
   a simple adder connected to the bias impression unit and generating a simple addition value from the biased inference output grade; and
   a divider dividing the weighted addition value by the simple addition value and outputting the center of gravity.

* * * * *